Feb. 5, 1929.

W. FISCH 1,701,232

COMBINED SHOCK ABSORBER AND JACK

Filed Jan. 26, 1926

INVENTOR.
WALTER FISCH.
BY
*Richard Dwan*
ATTORNEY.

Feb. 5, 1929.	1,701,232
W. FISCH
COMBINED SHOCK ABSORBER AND JACK
Filed Jan. 26, 1926    2 Sheets-Sheet 2
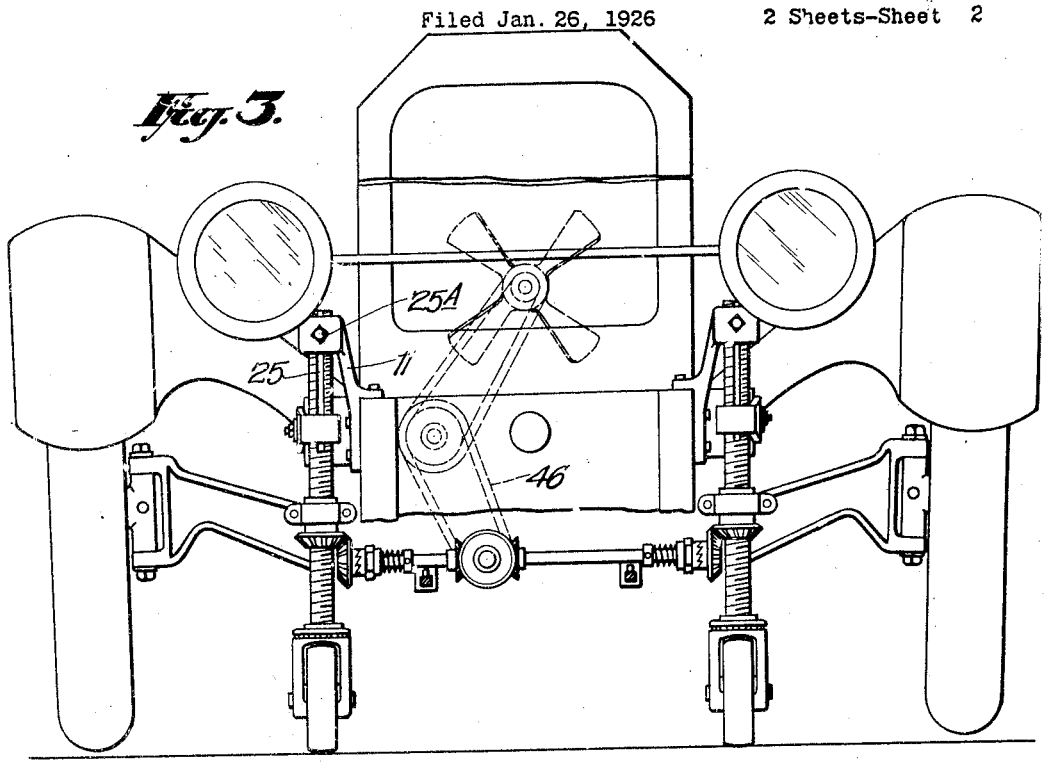
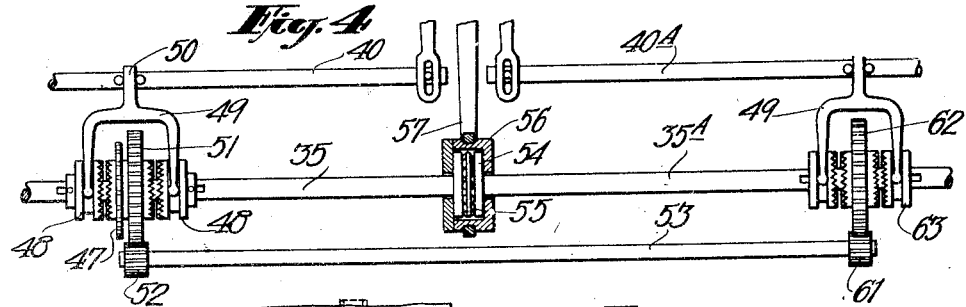
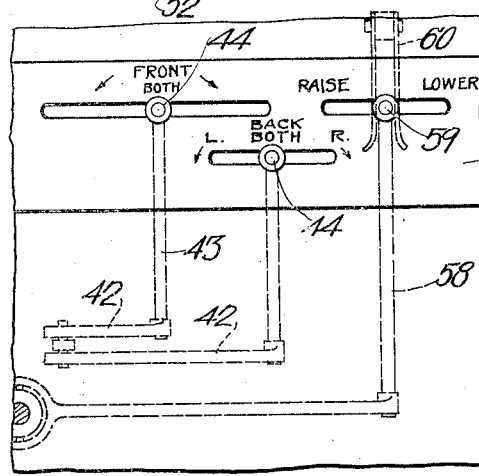
INVENTOR.
WALTER FISCH.
BY
ATTORNEY.

Patented Feb. 5, 1929.

1,701,232

UNITED STATES PATENT OFFICE.

WALTER FISCH, OF JERSEY CITY, NEW JERSEY.

COMBINED SHOCK ABSORBER AND JACK.

Application filed January 26, 1926. Serial No. 83,923.

This invention relates to combined shock absorbers and lifting jacks especially adapted for automobiles and the like.

A particular object of the invention is to provide in combination with a chassis of an automobile, a plurality of lifting jacks, one being disposed adjacent each wheel and being so arranged that they can be operated from the driver's seat of the vehicle.

A further object of the invention is to provide lifting jacks which will also serve as shock absorbers and which will transmit the shock received by the wheels to a shock absorbing medium to which the jacks are connected.

A further object of the invention is to provide jacks which can be operated simultaneously to raise the forward or rear end of the car, the jacks being adapted to serve as car supporting agents in case the one or more of the wheels are so damaged as to be unfit for use.

A further object of the invention is to provide in a device of this kind, a mechanism for operating the jacks whereby the same can be selectively operated from the dash board so that the driver will not have to move from his seat in order to jack up any one of the wheels as is now the case when changing of the tires is necessary.

Also my improved invention contemplates the automatic operation of the jacks through the medium of a driving mechanism which is operated from the motor shaft, in this way, the jacks being raised and lowered by power delivered from the engine.

To enable others skilled in the art to fully comprehend the underlying features of my invention that they may embody the same in the various modifications in structure and relation contemplated, drawings depicting a preferred form have been annexed as a part of this disclosure and in such drawings similar reference characters denote corresponding parts throughout all of the views, of which, Figure 1 is a top plan view of a motor vehicle chassis having associated therewith a plurality of lifting jacks, the mechanism for selectively and collectively operating the jacks being shown.

Figure 3 is a front view in elevation of a motor vehicle showing the relative position of the jacks at the forward end of the chassis and the connection between the driving mechanism for said jacks and the motor shaft of the vehicle.

Figure 4 is an enlarged detail view in top plan of the jack operating clutches and the other details of construction associated therewith, and Figure 5 is a view in front elevation of a portion of the dash board showing the three operating levers which are used to operate the front jacks and the back jacks and to raise and lower the jacks, it being understood that the manipulation of these levers is carried out from the driver's seat.

Figure 2:
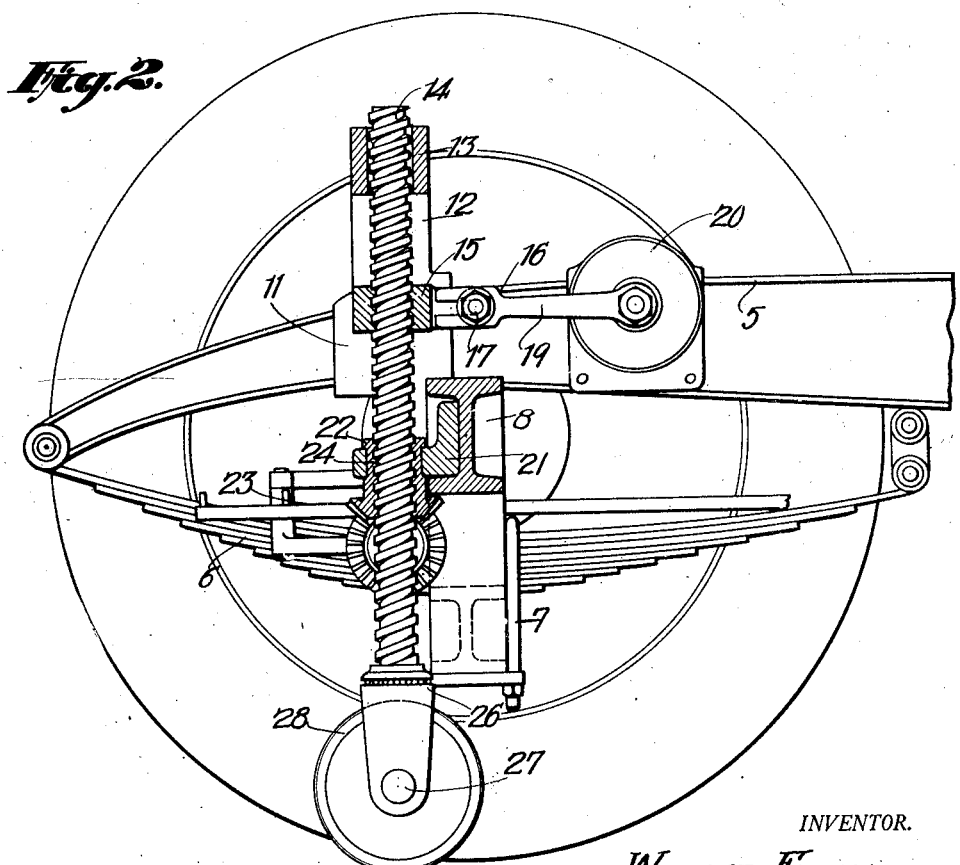
Figure 2 is a sectional view in elevation taken on the line 2—2 of Figure 1, the section being enlarged to show in detail the construction of one of the jacks, all of the jacks being similar in construction and being operated in substantially the same manner.

Referring to the drawings in detail, 5 indicates an automobile chassis of the usual construction, carrying at its forward end, the leaf spring members 6 which are secured in the usual manner through the medium of the shackle 7, the axle 8, the latter being of the I-beam type and carrying at its outer end, the wheels 9. The wheels at the rear end of the chassis being carried on the end of the usual axle which is embodied in the usual rear axle housing 10. The chassis 5 is formed of channel iron, after the usual manner and, adjacent its front end, carries the jack screw supporting brackets 11 one of which is disposed on both sides of the car adjacent the front wheels 9. In view of the fact that all of the jacks are supported and operated in the same manner, it is believed that a detailed description of one will suffice, and it will be noted in Figure 2, that the jack screw supporting brackets 11 are suitably fixed to the outer side of the chassis 5 and is provided with an upstanding neck portion 12, which carries at its upper end, the collars 13 through which the screw 14 has sliding fit, the screw being supported snugly therein so that it can be guided in its upward movement, which it has, when it partakes of the movement of the axle of the car when the wheels are riding into a depression to cause depression of the leaf spring 6. Below the collar 13 and supported on the jack screw 14 is the collar 15, which is provided with an ear member 16 through which passes a bolt 17, which engages in the slotted end of the shock absorber arm 19. The end of the arm 19 being secured to the shock absorbing element 20 after the usual manner. This shock absorber 20 is of the usual drum type which has therein a revolvable member, which, during a turning movement of the arm 19 tightens up on the inside of the casing and resists the turning movement of the arm 19 to thereby absorb the shock received at the outer end of said arm 19. The collar 15, which has threaded connection to the screw 14 will of course partake of any upward movement of the screw and will transmit the same through the arm 19 to the shock absorbers 20. To the axle 8, there is secured in any suitable manner the gear holding bracket 21 which may be made in two parts in the usual manner to accommodate therebetween the hub portion 22 of a bevelled gear 23, the hub portion 22 being reduced as at 24 to accommodate the bracket 21 so that the gear will be rotatably held in said bracket 21 but will be prevented from having any upward or downward movement relatively to said bracket. The bevelled gear 23 is internally threaded and the screw 14 passes therethrough and it is evident that a turning movement of the gear 23 in either direction will cause a lowering or a lifting movement of the screw 14. It will be noted that the upper end of the screw, in Figure 3, is provided with a longitudinal slot 25 into which extends the end of a suitable pin member 25 held in the sleeve 13 of the bracket 11.

The lower end of the jack screw 14 carries the saddle 26 which in its ends support a shaft member 27 upon which a ground engaging wheel 28 is revolvably carried. It will be evident, therefore that when a turning movement is imparted to the gear 23, the jack screw 14 will be raised or lowered and the wheel 28 will always be maintained in alignment with the median line of the car by reason of the engagement with the pin 25 of the slot in the jack screw 14. It will be noted that the shock absorber 20 is secured to the side of the chassis in any suitable manner such as by bolting. In order to operate the gears 23, one of which is disposed on each of the four jacks, which are adjacent the four wheels of the car, I provide constructions which are identical at the front and rear of the car, and it is believed that an explanation of the forward working member or mechanism will be sufficient.

In mesh with the gears 23, there is provided the bevelled driving gears 29 which are carried on the ends of the counter shafts 30 and 31, the latter being disposed on the right hand side of the front of the car and from the driver's seat being adapted to raise the right hand wheel by operating the jack. The shafts 30 and 31 carry at their inner ends the friction discs 32, which are adapted to be engaged at one side by the driving disc 33 and at the opposite side by the driving disc 34, it being understood that this friction drive mechanism will, with a continuous operation of the shaft 35 which carries the discs 32 and 34, will reverse the movement of the shafts 30 and 31 by contact with the disc 32 of either of discs 33 and 34. On the shafts 30 and 31 I provide the spring pressed clutch members 36 which are normally held against the toothed collar of the driving gears 29 through the medium of the springs 37 which are held in compressed position by the fixed collars 38, carried on the shafts 30 and 31. The clutch members 36 are engaged by one end of bell cranks 39, the ends of the bell cranks being extended to overlie a shift lever 40, one of which is disposed forwardly of the car and the other one rearwardly thereof. The shaft lever carries suitable pins 41 which lie adjacent the ends of the bell crank 39 and are so arranged that a forward movement of the lever 40 will throw the bell crank on the right hand side of the car to de-clutch the jack and allow the jack at the left hand side of the car to operate. The manipulation of this lever 40 is carried out through the medium of the lever arm 42, one of each of which is secured to and operates the front and back of the levers 40. A suitable post member 43 carries at its lower end, the lever 42 and at its upper end the operating handle 44, one of these handles being provided to manipulate the front lever 40 and the other being provided to manipulate the rear lever 40, both of which are identical in construction and operate in the same manner. It will be noted therefore, that a movement as shown in Figure 5 of the handle 44 to the end of the slot in the dash board 45 designated as L, will cause the forward throw of the lever 42 and a forward movement of the operating lever 40. This forward movement will, through the medium of the bell crank 39 clutch the right hand jack and will consequently allow the raising or lowering movement of the left hand jack, as desired. In order to control the operation of the shaft 35, which is driven from the fan shaft through the medium of suitable sprocket chains 46, I provide on either side of the sprocket engaging gear 47, the clutch members 48 which are suitably keyed to the shaft 35 and are engaged by the forked end of the shift levers 49, the end 50 of which, is disposed between suitable pins on the shift levers 40. It is evident, therefore, that a movement in either direction of the shift levers 40 will cause the drive of the shaft 35 through the sprocket wheel 47. The sprocket wheel hub also carries adjacent thereto a driving gear 51, which is in mesh with the pinion 52, which operates through the counter drive shaft 53 to drive another clutch mechanism on the rear shaft 35$^a$. It being understood, of course, that the operation of the forward jack must be provided for without causing operation of the rear jack and this is done by making the driving shaft into two parts, 35 and 35$^a$ as indicated. The abutting ends of the shaft are provided with the flanges 54, between which is disposed a suitable roller bearing 55, the flanges 54 and the roller bearing being disposed in a suitable housing 56 which is engaged by the bifurcated end of a shift lever 57, this lever being attached at one end to the lower end of a pivoted operating column 58, which carries at its upper end, the operating lever 59 which projects through a suitable slot in the dash board as do the operating levers 44. The lever 59, however, is seated between two leaf spring members 60 so that it is always maintained at a central position in the slot to prevent accidental operation of the jack or to prevent the operator from moving the lever to one side and then neglecting to place it back in neutral, which would cause jamming of the parts of the mechanism resulting in breakage thereto.

Figure 1:
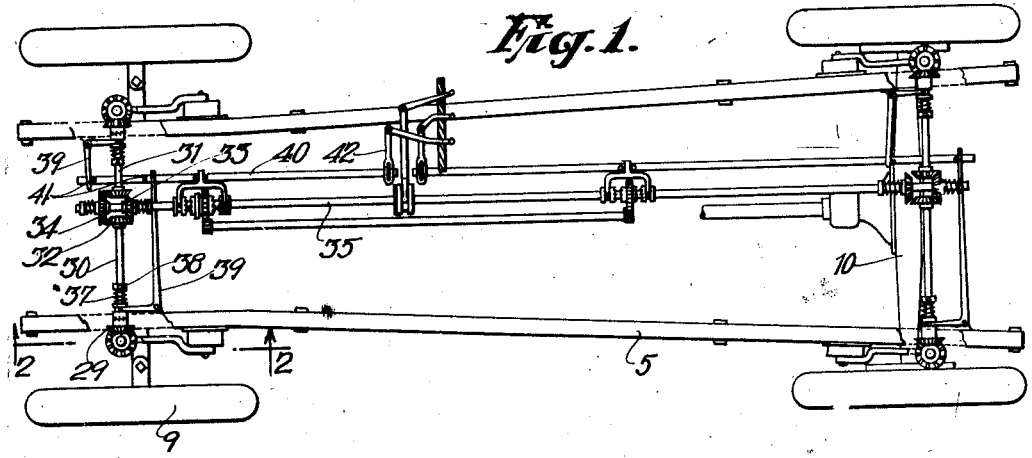

In Figure 1, the operating lever 59 is shown in position to drive the friction disc 32 to cause a raising movement of the jack, it being evident that if it was moved in the opposite direction, it would cause a lowering movement of the jacks. In Figure 5, the lever is shown at its neutral position and in this position, the friction discs 34 and 33 would be both out of contact with the disc 32 thereby being in a position to prevent any transmission of power from the driving shaft 35 to the jack.

The shaft 53 carries at its rear end, the pinion 61 which drives the gear 62 loosely journaled on the shaft 35$^a$ and formed with hub members which are provided in their edges with suitable teeth which are engaged by the sliding clutch members 63, these members being keyed to the shaft 35$^a$ as are the members 48 of the forward like mechanism, which has hereinbefore been described. The clutch members 63 are operated through the medium of the sliding lever 49 and the rear operating lever 40$^a$ in its operation will cause the operation of the shaft 35$^a$ as is evident.

No brackets have been shown in Figure 4 to support the shafts 35, 53 and levers 40 and 40$^a$, but it is believed that this is unnecessary in view of the fact that this mechanism will be suspended in any suitable manner from the floor of the car, the brackets being placed at any suitable point to carry the mechanism in working relation.

It is evident therefore, that I provide a combined lifting jack mechanism and shock absorber which, when used in combination with a motor vehicle can be manipulated to raise both of the front wheels or lower both of the front wheels and which can be used to raise any one of the wheels to change tires or can be used to raise any one or both of the rear wheels to make necessary adjustments and repairs to the car. The wheel members 28 associated with the jack also serve the purpose of supporting the particular point of the car so that the same can be moved along the ground when one of the wheels have been so badly damaged that it is unfit for use. The entire front of the car can be jacked up and will travel on the wheels 28 instead of on the vehicle wheels. This being also true of the rear end of the car, provided one of the wheels can be allowed to contact with the ground to provide a drive for the vehicle.

It will be evident, also, that manipulation of the levers 44 and 59 will cause operation of any one of the jacks, depending upon which one of the levers is selected. For instance, if it is desired to raise the front wheel on the left hand side, the lever 44 is moved to L end of the opening in the dash board 45. This will cause a forward movement of the lever 40 and will de-clutch the right jack mechanism. When this has occurred, the lever 59 will be shifted to either end of the slot in the dash board to either raise or lower the jacks and the left wheel will be raised off the ground. It will be particularly noted that when lever 40 is not moved backward or forward that the bell cranks 39 will not be operated and therefore the clutch mechanisms adjacent each jack will remain in clutching position to operate both jacks simultaneously upon a movement of the disc 32 in either direction as caused by the discs 33 or 34. A movement to the rear of the lever 40 will de-clutch the left hand jack thereby allowing the right hand wheel to be raised. A movement forward or rearward of the operating lever 59, will, of course, cause a raising or lowering movement to be imparted to the jack.

It is evident therefore, that I have provided an improved mechanism for simultaneously raising and lowering the front or rear wheels of a vehicle and for selectively operating any one of the jacks adjacent any one of the wheels whereby repair may be made or tires changed on any one of the wheels. Also, I have provided an improved jack member which constitutes the part of the shock absorbing mechanism and which will partake of the movement of the axle relatively to the chassis to lessen the shock transmitted to the body of the car from the wheel.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:—

The combination with a vehicle of a jack for each wheel thereof comprising a threaded member, a guide collar for said member, a gear having threaded connection to said member, a bracket supporting the gear from the axle, means for operating the gear to raise or lower the threaded member, a collar carried by said member, a shock absorbing device connected to said collar and adapted to frictionally resist a vertical movement of said threaded member, a counter-shaft for operating said gear, main front and rear operating shafts, clutches on said main shaft, front and rear shift levers, means for operating said levers from the dash of the vehicle and connections between said levers and said shaft whereby longitudinal movement of the levers will cause operation of the main shaft.

In testimony whereof I affix my signature.

WALTER FISCH. [L. S.]